United States Patent [19]
Burgess

[11] Patent Number: 5,612,679
[45] Date of Patent: Mar. 18, 1997

[54] ELECTROLYTIC TILT SENSOR

[76] Inventor: Lester E. Burgess, Box 522, Swarthmore, Pa. 19081

[21] Appl. No.: 403,292

[22] Filed: Mar. 14, 1995

[51] Int. Cl.⁶ .................................................. G08B 21/00
[52] U.S. Cl. .......................... 340/689; 340/664; 33/366; 252/62.2; 338/44; 200/185; 200/194; 200/61.52
[58] Field of Search ..................... 340/689, 664, 340/669, 670; 33/366, 363 N, 377, 379, 382; 361/760, 807; 200/183, 184, 185, 194, 233, 234, 190; 252/62.2; 338/44, 222; 324/660, 716; 202/52 R, 61.52

[56]  References Cited

U.S. PATENT DOCUMENTS

| | | | |
|---|---|---|---|
| 2,713,726 | 7/1955 | Dixson | 33/366 |
| 2,713,727 | 7/1955 | Balsam | 33/366 |
| 2,852,646 | 9/1958 | Broadley, Jr. | 338/44 |
| 2,932,809 | 4/1960 | Schoeppel | 338/222 |
| 3,020,506 | 2/1962 | Remington et al. | 338/86 |
| 3,171,213 | 3/1965 | Swarts et al. | 33/366 |
| 3,227,984 | 1/1966 | Halliday | 338/44 |
| 3,293,395 | 12/1966 | Halliday | 200/194 |
| 3,293,396 | 12/1966 | Boyd | 200/183 |
| 3,409,993 | 11/1968 | Hansen | 33/366 |
| 3,497,950 | 3/1970 | Squire et al. | 29/622 |
| 3,823,486 | 7/1974 | Bhat et al. | 33/366 |
| 3,843,539 | 10/1974 | Willing et al. | 252/62.2 |
| 3,946,494 | 3/1976 | Wells | 33/366 |
| 4,028,260 | 6/1977 | Zuest | 200/234 |
| 4,175,262 | 11/1979 | Harakawa et al. | 340/391.1 |
| 4,528,760 | 7/1985 | Plummer | 33/366 |
| 4,536,967 | 8/1985 | Beitzer | 33/366 |
| 4,628,612 | 12/1986 | Hori et al. | 33/366 |
| 4,641,434 | 2/1987 | Engler | 33/366 |
| 4,797,661 | 1/1989 | Wiley | 340/664 |
| 4,937,518 | 6/1990 | Donati et al. | 324/716 |
| 5,031,329 | 7/1991 | Smallidge | 33/366 |
| 5,150,104 | 9/1992 | Thomas et al. | 33/366 |
| 5,159,761 | 11/1992 | Cagan et al. | 33/366 |
| 5,170,567 | 12/1992 | Davis et al. | 3/366 |
| 5,174,033 | 12/1992 | Rider | 33/366 |
| 5,180,986 | 1/1993 | Swartz et al. | 33/366 |
| 5,279,040 | 1/1994 | Kippelt et al. | 33/366 |

FOREIGN PATENT DOCUMENTS

| | | |
|---|---|---|
| 2668824 | 5/1994 | France . |
| 9017431 | 3/1991 | Germany . |
| 733973 | 7/1955 | United Kingdom . |

OTHER PUBLICATIONS

Applicant's admitted prior art (Applicant'Specification pp. 3–4, 11 and FIGS. 1–2).

Primary Examiner—Jeffery Hofsass
Assistant Examiner—Benjamin C. Lee
Attorney, Agent, or Firm—Dilworth & Barrese

[57]  ABSTRACT

A method of configuring an electrolytic tilt sensor having a plurality of non-precious metal electrodes and a common electrode at least partially immersed in an electrolyte and included within an electrical circuit with a voltage supply by maintaining the power at the electrodes of the tilt sensor below a predetermined threshold power density measured at an immersed surface of the electrodes.

28 Claims, 10 Drawing Sheets

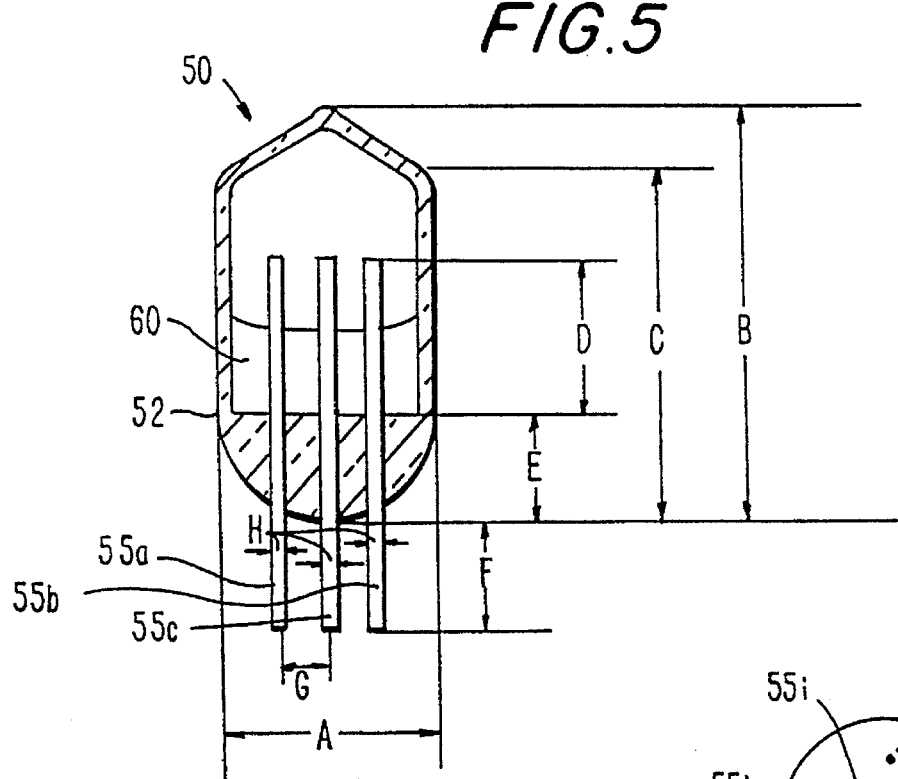
FIG.5
FIG.5b
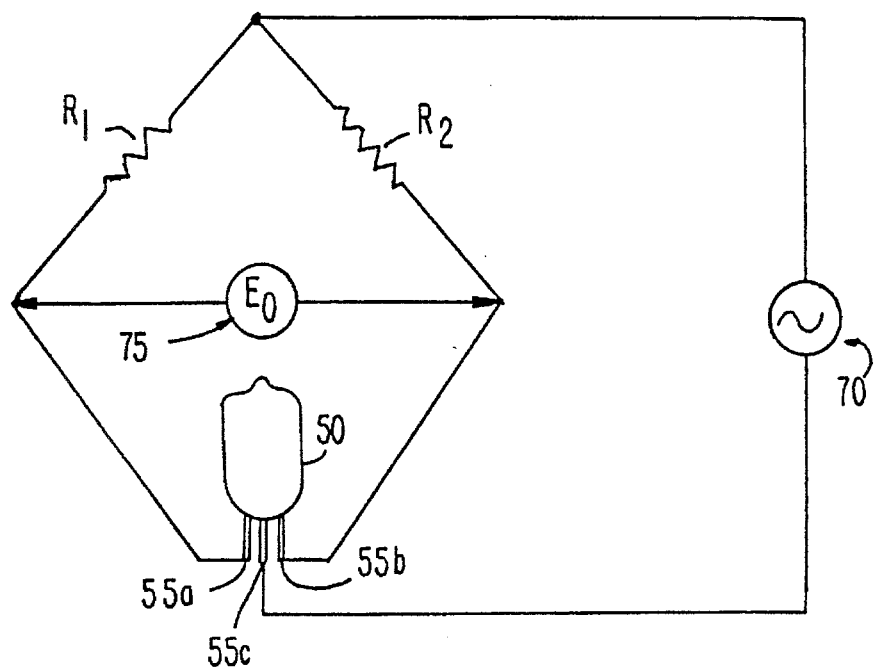
FIG.5a

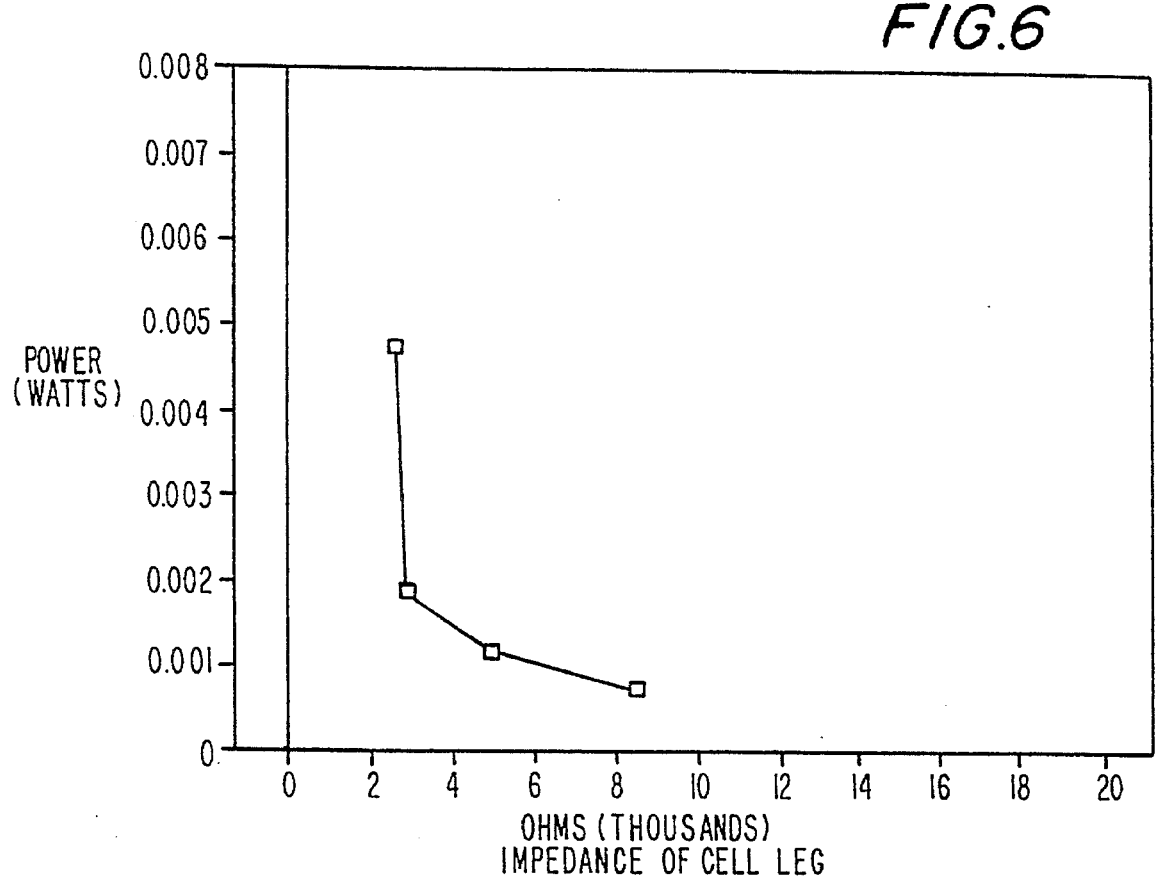

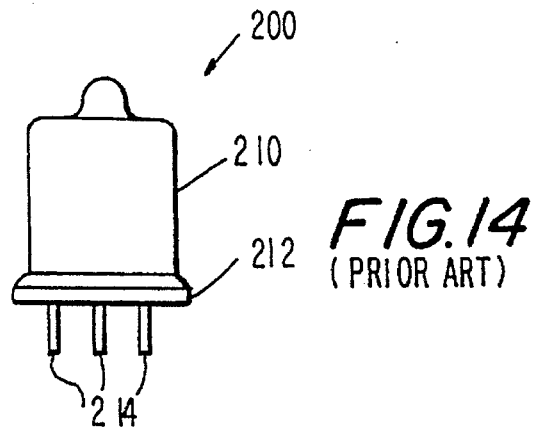
FIG. 14 (PRIOR ART)
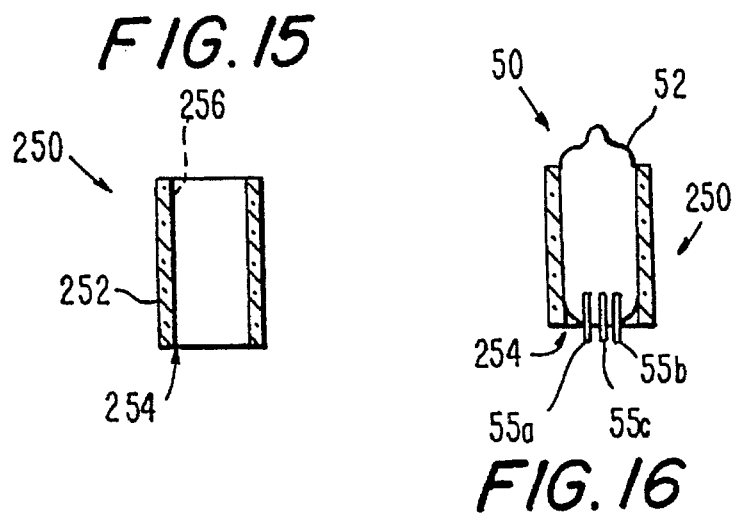
FIG. 15
FIG. 16
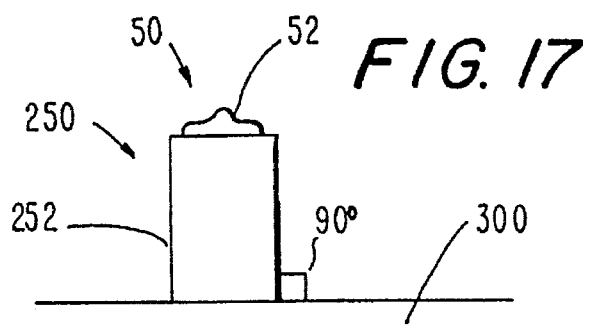
FIG. 17

ELECTROLYTIC TILT SENSOR

BACKGROUND OF THE INVENTION

1. Field of the Invention

This invention relates to electrochemical devices and, more specifically, to devices known as electrolytic tilt sensors.

2. Description of the Related Art

Electrolytic tilt sensors include devices that provide an output voltage proportional to tilt angle and a phase indicative of tilt direction when it is configured as part of an appropriate electrical circuit. The output voltage derives from the resistance within the electrolyte (also referred to as the "electrolytic solution") of the tilt sensor, which is a function of the tilt of the electrolyte due to the gravitational or other force. Tilt sensors, originally conceived for weapon delivery and aircraft navigation, have found a range of uses, including the monitoring of drill head angles in remote locations (such as wells) and the leveling of construction laser systems used in architectural alignment. This is primarily because the tilt sensor's voltage signal output may provide an input related to tilt angle to a pre-programmed guidance or other system, or provide an indicia of tilt angle via an electrical signal at a location away from the sensor.

An electrolytic tilt sensor is typically comprised of a glass cell that is partially filled with an electrolyte and three or more electrodes (including one common electrode) extending through the cell so that they are at least partially immersed in the electrolyte. The portion of the cell not filled with the electrolyte is a gaseous bubble, which shifts as the cell is tilted, also causing the electrolyte to shift. Consequently, the electrodes become more or less immersed with the electrolyte as the bubble shifts. This shift provides a change in impedance between any one electrode and the common electrode. When the tilt sensor electrodes are configured as part of an appropriate electrical circuit, the angle of tilt may be correlated to an output voltage of the circuit.

As noted, the fundamental output of an electrolytic tilt sensor configured within an electrical circuit is an output voltage that is correlated to the tilt angle. Thus, in order for the tilt sensor to work accurately and reliably over time, all the electrical parameters of the components of the circuit, such as the applied voltage and the resistors within the circuit, must be stable over time. Most importantly, the resistivity of the electrolyte must remain stable in order for the output voltage to remain accurately correlated to tilt angle. Thus, it is generally desired that the resistivity of the electrolyte in a commercially tilt sensor not vary by more than 25% over 1000 hours of usage for temperatures between −20° C. and +50° C. and that the tilt sensor output have a sensitivity of 7 millivolts per arc-minute and a response time of 1 second or less for a change in tilt angle. In addition, electrical null voltage should coincide with mechanical null voltage by no more than 3°. Null voltage is the minimum output as measured under standard test conditions with the tilt sensor at or near the horizontal level position. The mechanical null voltage is the voltage output when the tilt sensor is positioned with respect to a stable horizontally oriented reference surface. The change in the resistivity (or equivalent) of the electrolyte over time is referred to as the "load life".

There are, however, many electrochemical reactions, described in further detail below, that arise when a voltage is applied across an electrolyte (via metal electrodes) that give rise to a change in resistivity and, when used in conjunction with a tilt sensor, a deviation in output voltage for a given tilt angle. Where this change occurs over a relatively short period of operational time, the tilt sensor will be, at best, of little use and, at worse, dangerous (for example, when used in an aircraft navigational system). Precious metal electrodes have been used almost exclusively due to their chemical stability, which served to suppress some of these reactions sufficiently, and slow the change in resistivity of the electrolyte. However, because of their expense, electrolytic tilt sensors using precious metal electrodes did not find widespread commercial usage.

The use of non-precious metal electrodes in tilt sensors has not been successful. Although there may have been suggestions of a variety of tilt sensors using non-precious metal electrodes, nothing in the prior art divulged how to overcome the rapid electrolytic system breakdown (i.e., change in resistivity) in a tilt sensor when a non-precious metal electrode is used. While certain electrolytes which are inherently slow to degrade electrochemically may likewise have been suggested in the prior art, nothing in the prior art suggests their use with non-precious metal electrodes. Nor have additional operating parameters been previously identified that would result in a commercially viable non-precious metal electrode tilt sensor. Consequently, there have been no commercially successful tilt sensors that use non-precious metal electrodes.

For example, U.S. Pat. No. 4,028,260 to Zuest ("Zuest") refers to the use of non-precious metal electrodes (including thin metal precious metal electrodes), and discusses some of the electrochemical reactions that degrade performance. Nothing in Zuest, however, suggests that the devices would be reliable after 100 hours of operation, far short of the 1000 hour minimum generally required for a commercial tilt sensor. Furthermore, the Zuest electrolytes require the toxic material hydrazine monohydrate. Without this material, which would be have to be omitted for widespread commercial acceptance of a tilt sensor, the Zuest electrolytes degrade within a few hours. Thus, Zuest presents a very specifically composed electrolyte for use-with non-precious metal electrodes, which would not give rise to a commercially viable tilt sensor.

Similarly, U.S. Pat. No. 3,843,539 to Willing and Cooper ("Willing et al.") describes an electrolyte that uses ammonium carbonate in ethanol, methanol and a variety of higher molecular weight alcohols. Willing et al., however, focuses on a different facet of the tilt sensor art, specifically, properties that facilitate construction and calibration of the devices. In use, the device of Willing et al. as described would fail because of electrochemical reactions that would result in rapid degradation of the electrolyte and electrodes. Willing et al. fails to address or even recognize the difficulties of creating an operational tilt sensor. Furthermore, Willing et al. does not mention the use of non-precious metal electrodes, which tends to accelerate the degrading electrochemical reactions and complicate the task of constructing a viable commercial tilt sensor. Nor does Willing et al. raise the possibility of impressing specific operational parameters in order to minimize the electrochemical degradation.

It would be extremely beneficial to provide a low-cost electrolytic tilt sensor constructed with non-precious metal electrodes and an electrolytic solution which does not degrade during use.

SUMMARY OF THE INVENTION

It is an objective of the present invention to construct a tilt sensor using non-precious metal electrodes in conjunction with electrolytes where the various electrochemical factors that degrade performance of a tilt sensor are sufficiently suppressed so that a low cost tilt sensor is commercially viable. Specifically, it is an objective of the present invention to construct a tilt sensor that meets or exceeds the performance criteria requirement that the resistivity of the electrolytic solution not change by more than 25% over the course of 1000 hours of usage. It is a further objective to construct a tilt sensor where the resistivity of the electrolyte does not change by more than 25% over 1000 hours and at the commercially viable operational temperature range between approximately −20° C. and +50° C. (Acceptable performance at temperatures well above and below this range was an unexpected result of the present; invention. Acceptable performance for a number of the embodiments described below occurs at temperatures as high as +130° C. and as low as −50° C.)

The present invention achieves this objective by selecting the chemical constituents of the non-precious metal electrodes and the electrolytic solution so that, in conjunction with the imposition of certain operating parameters on the tilt sensor and, optionally, a thermal pre-treatment of the electrolytic solution, the electrochemical processes giving rise to degradation of the performance criteria are inhibited.

One important operational parameter of the present invention is the power or current density at the electrodes. All electrolytic factors that contribute to the degradation of performance of an electrolyte in a tilt sensor are related to power or current density at the electrodes. Thus, for an electrolyte with a select resistivity, the power or current density at the electrodes is set below a degradation threshold for relatively stable electrolytic performance.

Thus, in accordance with the present invention, there is provided an electrolytic tilt sensor comprising a containment vessel, an electrolyte sealed within the containment vessel, a plurality of electrodes including a common electrode formed at least in part with a non-precious metal and at least partially immersed in the electrolyte, the electrodes and the electrolyte adapted such that a threshold power density at the surface of any one of the electrodes is not exceeded when a voltage is applied across at least two of the electrodes.

The present invention also includes a method of determining the operative parameters of a tilt sensor comprising the steps of providing a tilt sensor including a containment vessel, an electrolyte sealed within the containment vessel, and a plurality of electrodes including a common electrode formed at least in part with a non-precious metal and at least partially immersed in the electrolyte; applying a voltage across at least two of the electrodes; monitoring the power at at least one electrode; varying the applied voltage such that the power at at least one of the electrodes exceeds the threshold power value; and determining the threshold power density, such that in use the threshold power density at the surface of any one of the electrodes is not exceeded when a voltage is applied across at least two of the electrodes.

The present invention also includes a method of determining tilt angle using an electrolytic tilt sensor, wherein the tilt sensor, having a plurality of nonprecious metal electrodes and a common electrode at least partially immersed in an electrolyte and configured as part of an electrical circuit with a voltage supply, provides an output voltage that is proportional to the tilt angle, the improvement comprising maintaining the voltage across the electrodes and the common electrode of the tilt sensor below a predetermined threshold power density measured at an immersed surface of the electrodes.

Generally, an electrolyte is comprised of a salt capable of conducting an electrical charge and one or more solvents. The major electrolytic salts used in the electrolytes of the present invention, for example, are chosen from metal cations, such as sodium, potassium, lithium, calcium and cesium, because the ionic species of these elements offer good conductivity at every level of dilution in a wide variety of organic solvents. These cations, with controlled pH (in the range of 8 to 9), exhibit freedom from non-precious metal erosion in the promotion of organo-metallic/organic electrochemical reactions. The electrolytic salts of the present invention are also selected from anions, such as nitrate, carbonate, acetate (and other organic anions) and hydroxide, because such anions resist chemically combining with the metallic elements (iron, nickel, chromium, etc.) of the non-precious metal electrode materials. (Ammonium ion was also used in combination with these anions because under the electrolytic conditions of this invention, this gaseous cation does not chemically combine with the non-precious metal electrodes or with its carrier solvent.) Solvents may include methanol, ethanol, butanol, propanol, isopropanol and other higher molecular weight alcohols because these compounds favor ionic dissociation of the preferred electrolytics salts while offering enhanced wetting of the non-precious metal electrodes of the present invention. Solvents also include acetone, methylethylketone, esters, butyl carbitol, butyl cellusolve, 2-methoxyethanol and methyl carbitol because these liquids favor ionic dissociation and provide the ability to control the electrolyte's viscosity (for tilt sensing dampening) or response time control. Further, such solvents offer a variety of boiling points that, in combination, control the temperature characteristics of the specific formulated electrolyte. The electrodes used include 52 Alloy (a nickel-cobalt-copper-iron alloy well known in the art), Kovar (a nickel-cobalt-iron alloy well known in the art), electro-non-precious material) with a precious metal coating (including platinum and gold), tungsten, molybdenum, Sylvania No. 4 alloy (a nickel-chrome-iron alloy well known in the art), tantalum, titanium, stainless steel, clean non-precious base metals, nickel, and nickel coated base metals, because such metallic elements or alloys are compatible with state-of-the-art glasses, providing good glass to metal seals, and offer, in some cases, non-magnetic properties. (Metal "coatings," for the purposes of this application, may include metal films and metal plating, and, include the products of electro-deposit or cladding processes.)

In accordance with the present invention, each salt separately or in combination with each solvent separately or in combination offers electrolytic performance with each specific electrolytic electrode material within the selected operating parameters described herein.

BRIEF DESCRIPTION OF THE DRAWINGS

The features of the present invention will be better understood and become readily apparent by referring to the following detailed description of an illustrative embodiment of the tilt sensor, taken in conjunction with the accompanying drawings, in which:

FIG. 2 is an electrical circuit incorporating the tilt sensor of FIGS. 1 and 1a;

FIG. 3 is a graph of output voltage versus tilt angle for the tilt sensor of FIGS. 1 and 1a;

FIG. 5 is a cross-section of a tilt sensor of the present invention;

FIG. 5a is an electrical circuit incorporating the tilt sensor of FIG. 5;

FIG. 5b is a bottom view of a tilt sensor such as that shown in FIG. 5 having four electrodes surrounding a common electrode to define two distinct axes of orientation;

FIG. 6 is a graph of power applied at an electrode of a tilt sensor of the present invention versus the impedance between the electrode and the common electrode;

FIG. 14 is a side view of a tilt sensor;

FIG. 15 is a cross-section of a leveling collar of the present invention;

FIG. 16 is a cross-section of the tilt sensor of FIG. 5 supported within the leveling collar of FIG. 15; and FIG. 17 is a side view of the collar and tilt sensor of FIG. 16 mounted to a circuit board.

DETAILED DESCRIPTION OF THE PREFERRED EMBODIMENTS

Figure 1:
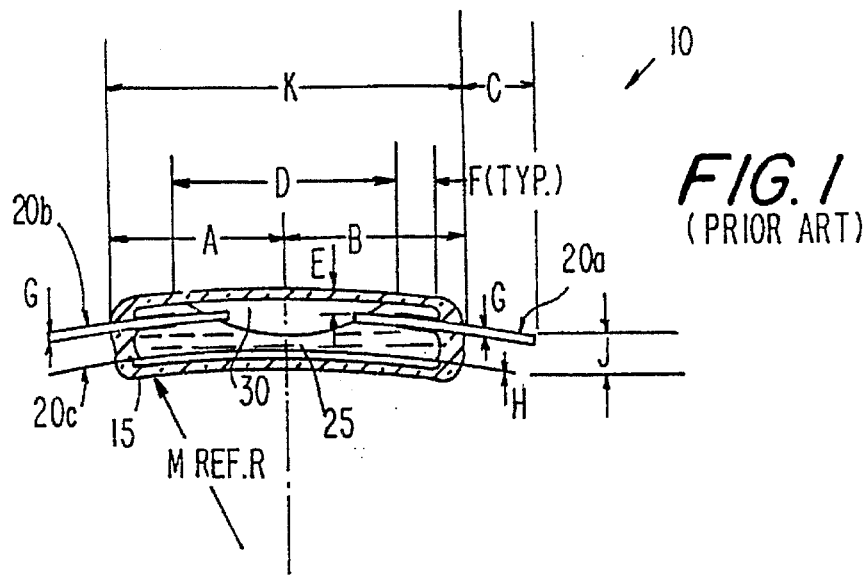
FIG. 1 is a cross-section of a tilt-sensor.

Referring now to the drawings, FIG. 1 shows a typical configuration of a tilt sensor 10, as is known in the art. The tilt sensor 10 is comprised of a glass cell 15, a plurality of electrodes 20a, 20b, 20c extending into the interior of the cell 15, an electrolytic fluid 25 surrounding at least a portion of the electrodes 20a, 20b and all of common electrode 20c, and a vapor bubble 30. There is typically a hermetic seal between the cell and the electrodes, so that the electrolyte and the vapor bubble remain completely within the cell.

Figure 1A:
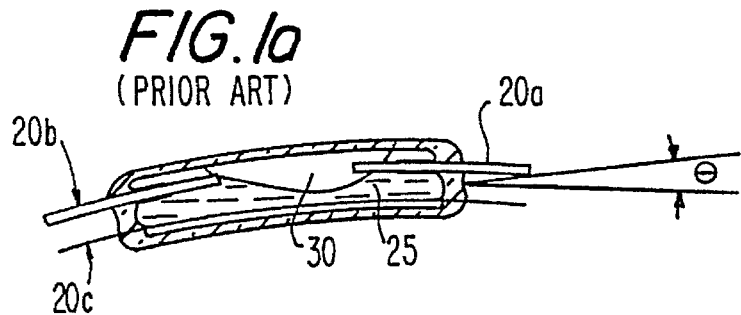
FIG. 1a is a cross-section of a tilt sensor of FIG. 1 tilted by an angle θ from a horizontal position.

FIG. 1 shows a level tilt sensor 10 where the electrodes 20a and 20b are covered equally by the electrolyte 25. FIG. 1A shows the tilt sensor 10 of FIG. 1 when tilted through an angle θ. Because of the gravitational force on the electrolytic solution 25, the bubble 30 shifts so that electrode 20b is immersed in more of the electrolyte 25 than electrode 20a. This is the basis of operation of tilt sensors: the shifting electrolyte 25 causes changes in impedance in the conductive path between electrode 20a and common electrode 20c and the conductive path between electrode 20b and common electrode 20c. As described below, when an appropriately configured electrical circuit includes the tilt sensor, the change in impedance is proportional to tilt angle and may be detected using a voltmeter, for example, within the circuit.

By way of example, the tilt sensor 10 of FIGS. 1 and 1a has the following nominal values (in inches, unless otherwise noted): A=B=0.625; C=0.125; D=0.804; E=0.083; F=0.100; G=0.025; H=0.016; J=0.125; K=1.250; the tilt sensor is substantially circular with outer diameter 0.280 and the radius of curvature of surface M is 7.0. The glass tube may be manufactured using Series 0120 glass manufactured by Corning, series KG12 glass available from Kimble, or, more generally, glass with a coefficient of thermal expansion on the order of 0.00009 inches/° C. The electrodes may be comprised of platinum, and the electrolyte may be a solution of potassium iodide dissolved in ethanol. As previously noted, the configuration of the tilt sensors and the make-up of the electrodes and the electrolyte vary widely depending on the contemplated use of the tilt sensor. Typical tilt sensors cannot handle power levels much above 40 milliwatts continuously or 450 milliwatts intermittently, per electrode. Alternating current ("A.C.") is always applied to electrolytic tilt-sensors.

Figure 2:
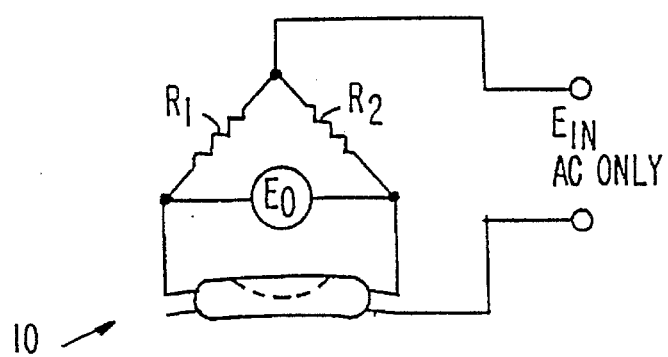

FIG. 2 shows the tilt sensor 10 of FIGS. 1 and 1a incorporated into a typical A.C. electrical circuit used for converting tilt angle into a voltage output $E_o$. In theory, the tilt angle of the sensor 10 incorporated into the circuit of FIG. 1a is related to $E_o$ as follows:

$$E_o = E_{in}(Z_2 R_2^{-1} - Z_1 R_1^{-1})$$

Where:

$Z_n = \overline{L}(d-A)^{-1}((N_n e_n) - (Kra)e_n)^{-1}$ (for $n = 1,2$)
 = Impedance between one of the electrodes 20a, 20b and the common electrode 20c of the tilt sensor 10

$\overline{L}$=specific conductivity (in MHOS)
$N_n$=The immersed electrode length when the tilt sensor is level
$e_n$=The electrode diameter
K=0.0002908(for cm/Arc min.)
 =0.000004872(for cm/Arc sec.)
r=vial radius
a=tilt angle
d=distance between electrodes
A=area of the common electrode The voltage output may be used as the input of another electrical circuit, where it is converted to degrees (or other measure of angle) and displayed to an operator, or it may provide the tilt angle input to a pre-programmed guidance or other system. Other circuits will also provide a phase that shows the direction of tilt. Still other circuits may use multi-electrode tilt sensors and give an electrical indicia of tilt along different axes.

Figure 3:
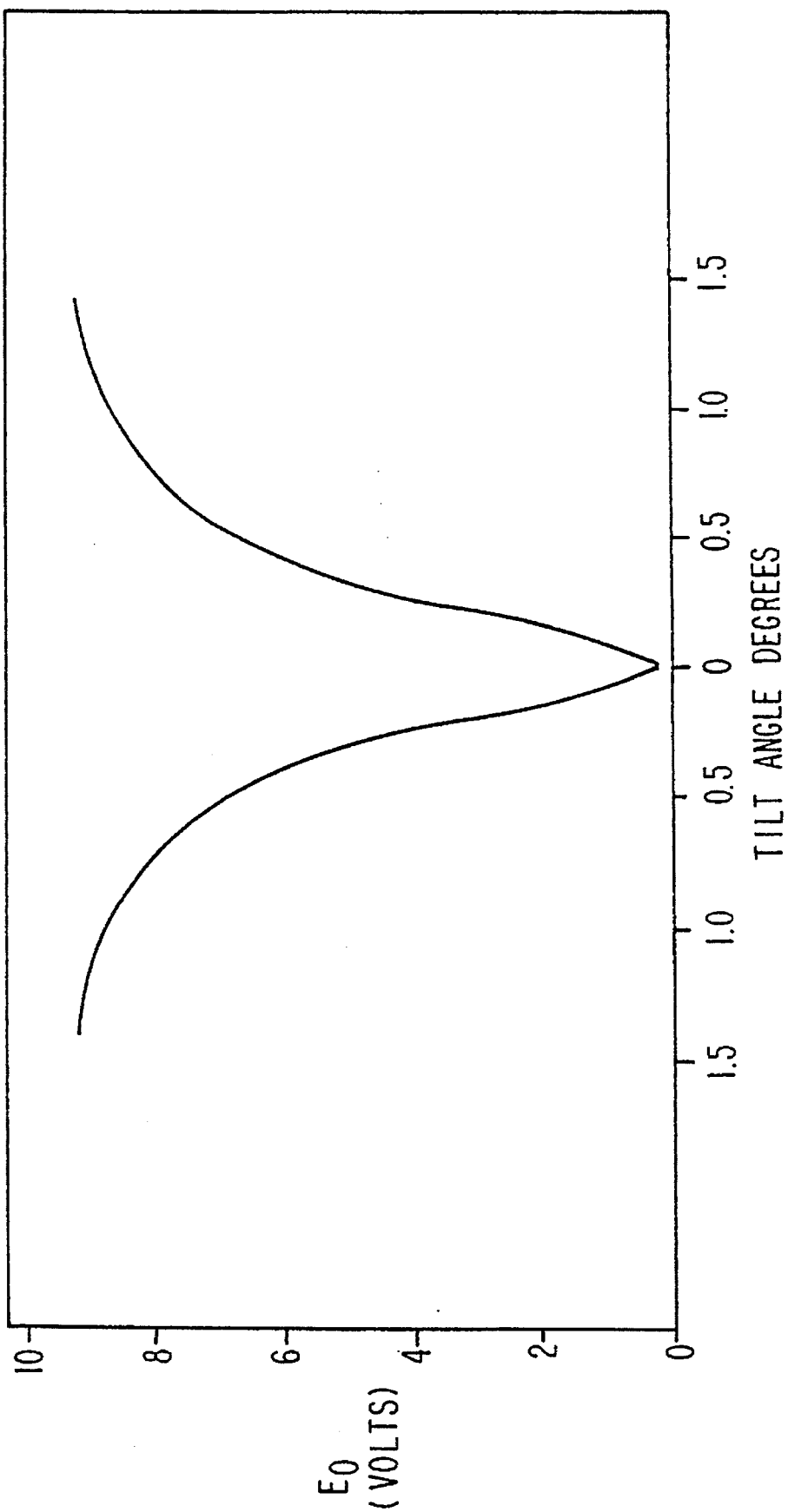

Although a particular tilt sensor may be mathematically modeled so that the voltage output is correlated to tilt angle via a mathematical equation, in practice, the tilt sensor is calibrated empirically. Thus, the tilt sensor is incorporated into a circuit such as that of FIG. 2, and output voltage is measured over a range of tilt angles. FIG. 3 depicts output voltage versus tilt angle for the circuit of FIG. 2, where R1 and R2 each equal to 1K ohm, and the input voltage equals 6.5 volts A.C.

As previously noted, a fundamental limitation concerning prior art tilt sensors lies in the fact that there are many electrochemical processes that contribute to performance degradation. In general, alternating current applied to the tilt sensor circuit may be converted to direct current in the electrolyte when the electrolyte acts as an electrical current valve. The resulting D.C. current, referred to as "A.D.C.," may create a host of conditions that contribute to the degradation in performance of a tilt sensor.

Factors contributing to the degradation may include the erosion, due to A.D.C., of the electrodes from the redox of the organic and/or inorganic components of the electrolyte. The A.D.C. redox molecules may also promote or catalyze other organo-metallic reactions, either ionically or by free radical mechanisms. The presence of A.D.C. gives rise to reactions that promote the formation of insoluble insulating coatings on the electrodes.

Another factor that may contribute to the degradation of performance is the production of hydrogen and oxygen gases as a by-product of A.D.C. This creates a chemical environment that slows the reaction rate, effectively increasing the resistivity of the electrolyte.

A.D.C. may render inert electrolytes active, potentially contributing to a change in resistivity. A.D.C. may also remove or add metallic ions to the electrolyte, thereby affecting its resistivity and/or promoting organo-metallic reactions.

As noted above, acceptable performance criteria for a commercially viable tilt sensor broadly requires that the change in resistivity of the electrolyte (the "load life") be less than 25% over 1000 hours, preferably at operating temperatures between −20° C. and +50° C.

Because of their relatively stable atomic configuration, precious metal electrodes reduce some of the electrochemical reactions, allowing the performance criteria (most importantly the load life) to be met using a wide range of electrolytes. However, because of the cost of using precious metal electrodes, it is desirable to construct a tilt sensor with non-precious metal electrodes and an electrolyte that meets the load life criteria. While constructing electrodes of non-precious metals with a precious metal film, plating or other coating may reduce some of the cost, these electrodes often exhibit the same rapid degradation in performance as non-coated non-precious metal electrodes because of the porosity of the film. Thus, they are also treated as non-precious metal electrodes for purposes of this application. (Precious metal coatings on non-metallic materials, such as glass, ceramics, plastics, graphites, and glazed metals (such as porcelain), are also treated as non-precious metal electrodes for the purposes of this invention.)

Figure 4:
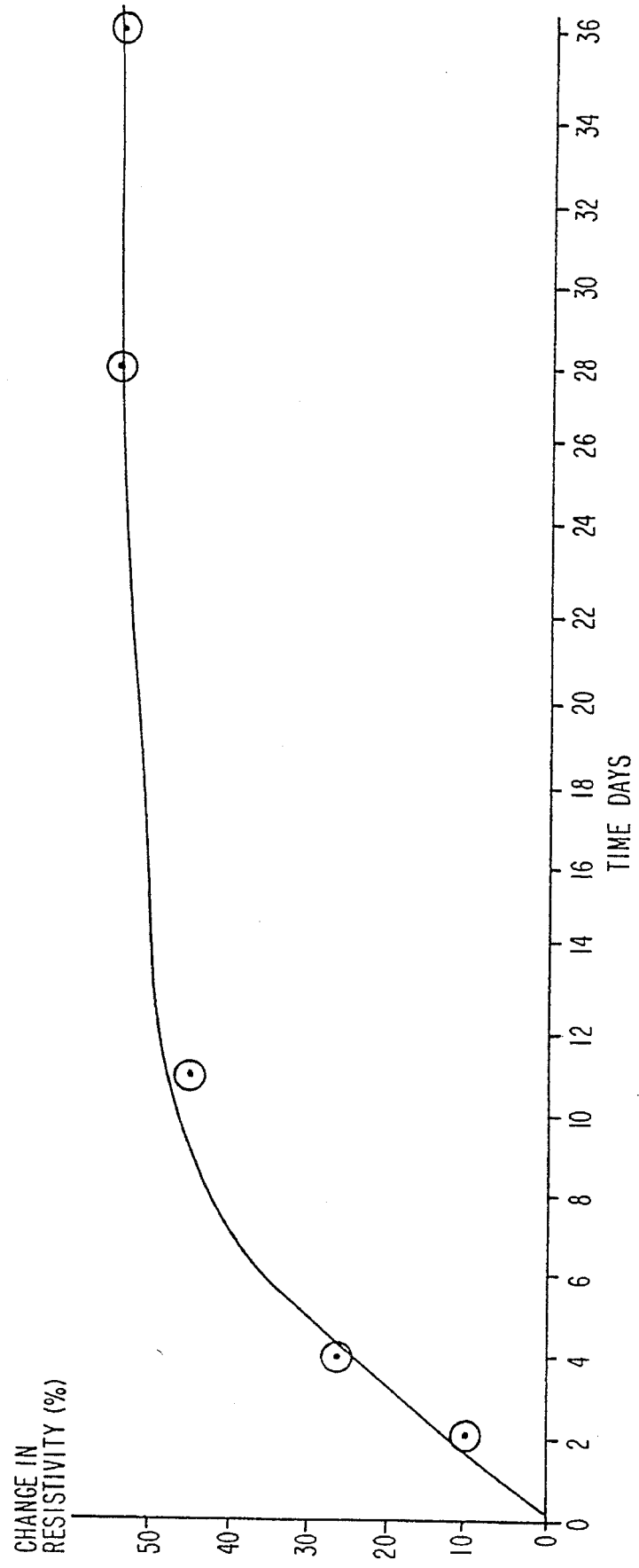
FIG. 4 is a graph of the percentage change in resistivity of an experimental tilt sensor versus time.

As an example of the disadvantage of the use of non-precious metals as the electrodes, FIG. 4 depicts the percentage change in resistivity over time for a non-precious metal electrode—Kovar—in an electrolytic solution of 95 parts per volume of ethanol, 5 parts per volume of water and sufficient bicarbonate of soda so that the initial leg impedance (i.e., the impedance between one of the tilt sensor electrodes and the common electrode) when the sensor is level is 1400 ohms. With the tilt sensor level, the change in leg impedance gives a measure of change in resistivity of the solution. As seen, within five days at room temperature the change in resistivity is greater than 25% and within 10 days is close to 50%. This is unacceptable for many uses.

FIG. 5 shows a tilt sensor 50 that is typical of the present invention. It is comprised of a glass cell 52, non-precious metal electrodes 55a, 55b, non-precious metal common electrode 55c, and electrolytic solution 60. As noted above, there are many designs and configurations of tilt sensors, depending on the contemplated usage, and the configuration of tilt sensor 50 of FIG. 5 is one of many. The present invention is not restricted to a particular physical configuration of the tilt sensor. And, as noted above, it is not limited to measuring tilt in one dimension. FIG. 5b, for example, shows a bottom view of a tilt sensor, such as that shown in cross-section in FIG. 5, having four electrodes 55e, 55f, 55g and 55h surrounding common electrode 55i. Electrodes 55e and 55f, and common electrode 55i may be used to measure the tilt along a first axis, while electrodes 55g and 55h, and common electrode 55i may be used to measure the tilt along a second axis perpendicular to the first axis. Tilt sensors with three or more pairs of electrodes may also be configured, each pair (along with the common electrode) providing a measure of tilt along a distinct axis. However, because the preferred embodiments, discussed below, focus on the make-up and treatment of the electrodes and electrolytic solution, the single axis tilt sensor of FIG. 5 is referred to with respect to all the preferred embodiments.

By way of example, the tilt sensor of FIG. 5 has the following nominal dimensions (in inches unless otherwise noted): A=0.280; B=0.650; C=0.450; D=0.150; E=0.150; F=0.16; G=0.06; and H (the width of the electrodes 55a, 55b and common electrode 55c)=0.015. The glasses discussed above with respect to FIG. 1 may also be used to fabricate the glass cell 52 of FIG. 5, but plastics, such as epoxies, polyesters, polyvinyl chloride, polycarbonate, and both classes of thermoplastic and thermoset plastic, may also be used. FIG. 5a shows the A.C. circuit used to demonstrate the performance of the embodiments discussed below. Electrodes 55a, 55b are connected to 1000 ohm resistors R1 and R2, respectively, which are in turn connected to the circuit voltage supply 70, and common electrode 55c is also connected to voltage supply 70. The bias output voltage $E_o$ is measured at 70 volts.

The preferred electrolytes of this invention use electrolytic salts that are less susceptible to organo-metallic reactions, thereby suppressing electrolytic breakdown. Ammonium carbonate, for example, is a preferred electrolyte because it is less reactive than other metals, such as the alkaline metals currently used in precious metal tilt sensors and which are more susceptible to organo-metallic reactions.

In designing the tilt sensors of the present invention, there are parameters other than the material of the electrodes and the chemical composition of the electrolytes that give rise to an acceptable load life. In particular, there is a measurable threshold power density at the electrodes which, when surpassed, gives rise to rapid degradation of the particular electrolyte. This threshold power density is found for electrolytes in tilt sensors using precious and non-precious metal electrodes alike. Thus, when the threshold power density is determined, the power applied to the non-precious metal tilt sensor may be regulated to remain below the threshold, leading to an acceptable load life.

The following are examples of tilt sensors of the present invention having non-precious metal electrode/electrolyte combinations and specific operating criteria, namely, a threshold (maximum) power density at the electrodes. The examples are taken from load life (i.e., the change in resistivity of the electrolyte over time) tests of a number of combinations of electrolytes and non-precious metal electrodes where varying power densities were applied at the electrodes.

Unless otherwise noted, for each example given below, a number of tilt sensors 50 of FIG. 5 were constructed using the same non-precious metal electrodes 55a, 55b and nonprecious metal common electrode 55c, and the same chemical constituents for the electrolyte 60. The amount of electrolytic salt is varied to vary the resistivity of the electrolyte 60 between the various sensors 50 (which is monitored via the "leg" impedance between electrodes 55a, 55b and common electrode 55c when the sensor is not tilted).

To formulate the various resistivity electrolytes described in the following examples, each ingredient is weighed, combined and incorporated by mixing (sometimes with heat) with one or more solvents. In one method, the electrolytic solvent is saturated with the electrolytic salt, the low impedance value between one of the electrodes 55a, 55b and common electrode 55c is determined when the tilt sensor 50 is level, and the impedance is increased to the desired level by adding solvent. (For a level tilt sensor, this impedance value is also an indicia of the resistivity of the electrolyte.) Alternatively, distilled or deionized water is saturated with the electrolytic salt, which is then added to the solvent to reach the desired impedance. The impedance of the electrolyte is determined by incorporating it within an A.C. electrical circuit, and making voltage and current measurements.

EXAMPLE #1

Electrodes 55a, 55b and common electrode 55c of a number of tilt sensors 50 of FIG. 5 are each comprised of 52 Alloy. Electrolytic solution 60 of FIG. 5 is comprised of 90 percent by volume of ethyl alcohol, 10 percent by volume of distilled water and ammonium carbonate. The amount of ammonium carbonate is varied among the tilt sensors 50 to achieve impedances of 2800, 3000, 5000 and 8500 ohms. The tilt sensors 50 are each incorporated into an electrical circuit as shown in FIG. 5a. The applied voltage at the voltage supply 70 is 6.5 volts A.C.

Load life drift was measured as a change in voltage across resistor R1, and was less than 10% for the sensors having impedances of 3000 and 5000 ohms over 100 hours, and immeasurable for the sensor having an impedance of 8500 ohms over 100 hours. For the sensor having an impedance of 2800 ohms, the load life was greater than 25%. The load life change levelled off at the lower impedance value and remained below 15% for exposure times exceeding 1000 hours. The higher impedance test unit experienced virtually no change (less than 5%) during a similar period. Thus, the load life improved with increasing resistivity.

FIG. 6 shows a graph of the experimental results of power measured at the electrodes 55a, 55b versus the impedance between the electrodes 55a, 55b and commonelectrode 55c for these tilt sensors. (The power may be determined by measuring voltage and current across the electrodes 55a, 55b and common electrode 55c.) As seen, power and impedance are inversely related: below an impedance of approximately 3000 ohms, the power in the cell increased dramatically and load life performance degraded markedly. As defined above, the threshold power is where the load life performance markedly degrades. Thus, the point at which the power in the cell dramatically increases is additionally referred to as the threshold power.

The data contained in FIG. 6 is used to determine a threshold power density for the electrolyte of this embodiment. From FIG. 6, the threshold power for this electrolyte (i.e., where the power in the cell is shown to increase markedly) is approximately 0.002 Watts where the area of the electrode exposed to the electrolytic solution is approximately 0.061 cm$^2$. Thus, the threshold power density of this ammonium carbonate electrolyte is approximately 0.033 W/cm$^2$. For power densities applied at the electrodes below this threshold (regardless of leg impedance, or, more generally, the resistivity of the electrolyte) the load life will be acceptable for a commercial sensor.

EXAMPLE #2

Electrodes 55a, 55b and common electrode 55c of a number of tilt sensors 50 of FIG. 5 are each comprised of Alloy. Electrolytic solution 60 of FIG. 5 is comprised of 50 percent by volume of glycerol, 50 percent by volume of distilled water and ammonium carbonate. The amount of ammonium carbonate is varied among these tilt sensors 50 to achieve impedances of 1800, 2200, 5500 and 9700 ohms. The tilt sensors 50 are each incorporated into an electrical circuit as shown in FIG. 5a.

Figure 7:
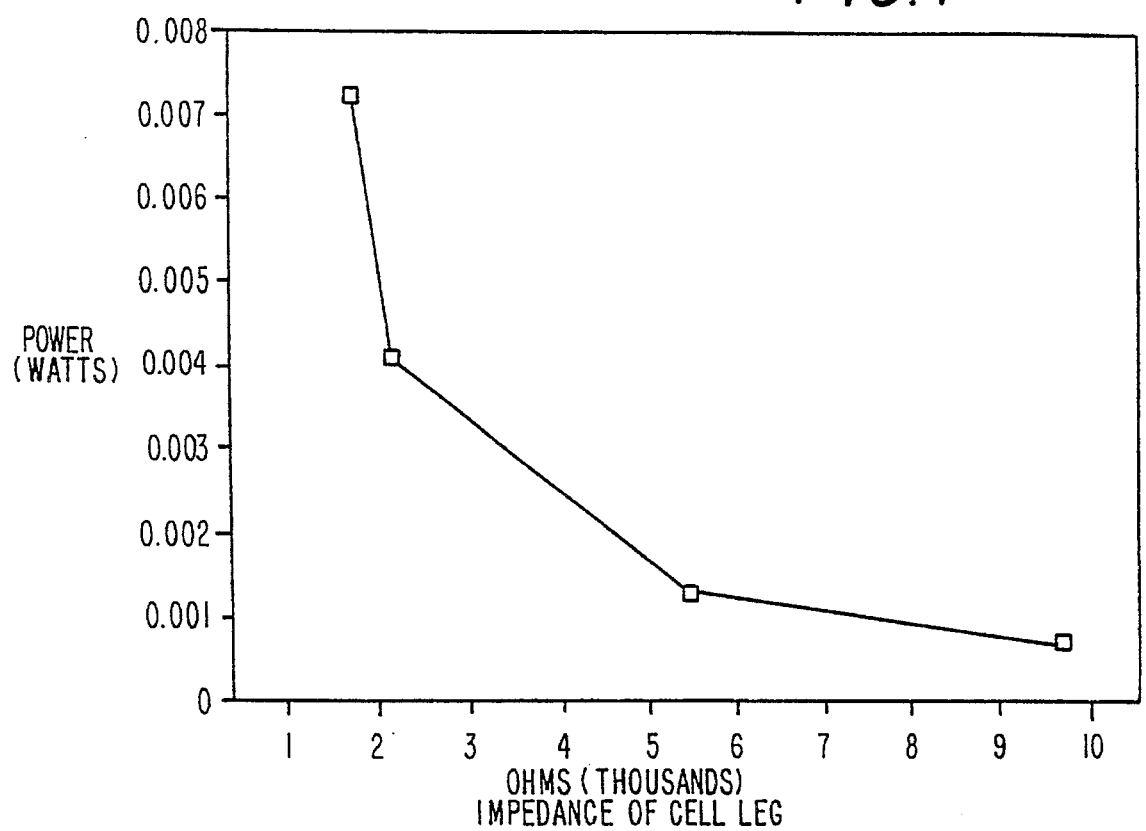
FIG. 7 is a graph of power applied at an electrode of a tilt sensor of the present invention versus the impedance between the electrode and the common electrode.

FIG. 7 shows a graph of the experimental results of power measured at the electrodes 55a, 55b versus the impedance between the electrodes 55a, 55b and common electrode 55c for these tilt sensors 50. As seen, power and impedance are inversely related: below an impedance of approximately 5500 ohms, the power in the cell increased dramatically and load life performance degraded markedly. As defined above, the threshold power is where the load life performance markedly degrades. Thus, the point at which the power in the cell dramatically increases is additionally referred to as the threshold power.

The data contained in FIG. 7 is used to determine a threshold power density for the electrolyte of this embodiment. The threshold power for marked electrolytic degradation (i.e., where the power in the cell is shown to increase markedly) is approximately 0.0013 Watts where the area of the electrode exposed to the electrolytic solution is approximately 0.061 cm$^2$. Thus, the threshold power density of this ammonium carbonate electrolyte is approximately 0.02 W/cm$^2$. For power densities applied at the electrodes below this threshold (regardless of leg impedance, or, more generally, the resistivity of the electrolyte) the load life will be acceptable for a commercial sensor.

Accordingly, when the applied voltage at the power supply 70 is between 0.086 and 0.116 volts A.C., the power density is maintained below the threshold level for leg impedances even lower than 5500 ohms. For this voltage input, the load life was immeasurable for an impedance of 1800 ohms over 100 hours, and 3% for impedances of 5500 and 9700 ohms over 100 hours.

EXAMPLE #3

Electrodes 55a, 55b and common electrode 55c of a number of tilt sensors 50 of FIG. 5 are comprised of 52 Alloy. Electrolytic solution 60 of FIG. 5 is comprised of 50 percent by volume of ethylene glycol, 50 percent by volume of distilled water and ammonium carbonate. The amount of ammonium carbonate is varied among these tilt sensors 50 to achieve impedances of 1500, 3000, 4400, 8400 and 20,500 ohms. The tilt sensors 50 are each incorporated into an electrical circuit as shown in FIG. 5a. The applied voltage at the voltage supply 70 is 6.5 volts A.C.

The load life, measured as a change in voltage across resistor R1, was 18% for the sensor having an impedance of 4400 ohms over 100 hours, and 11% for those sensors having impedances of 8400 and 20,500 ohms over 100 hours. For the sensors having impedances of 1500 and 3000 ohms, the load life was greater than 25%. Thus, the load life improved with-increasing resistivity. (As in Example #1, even at the lower impedances the load life should level off and remain below 25% for exposure times approaching 1000 hours.)

Figure 8:
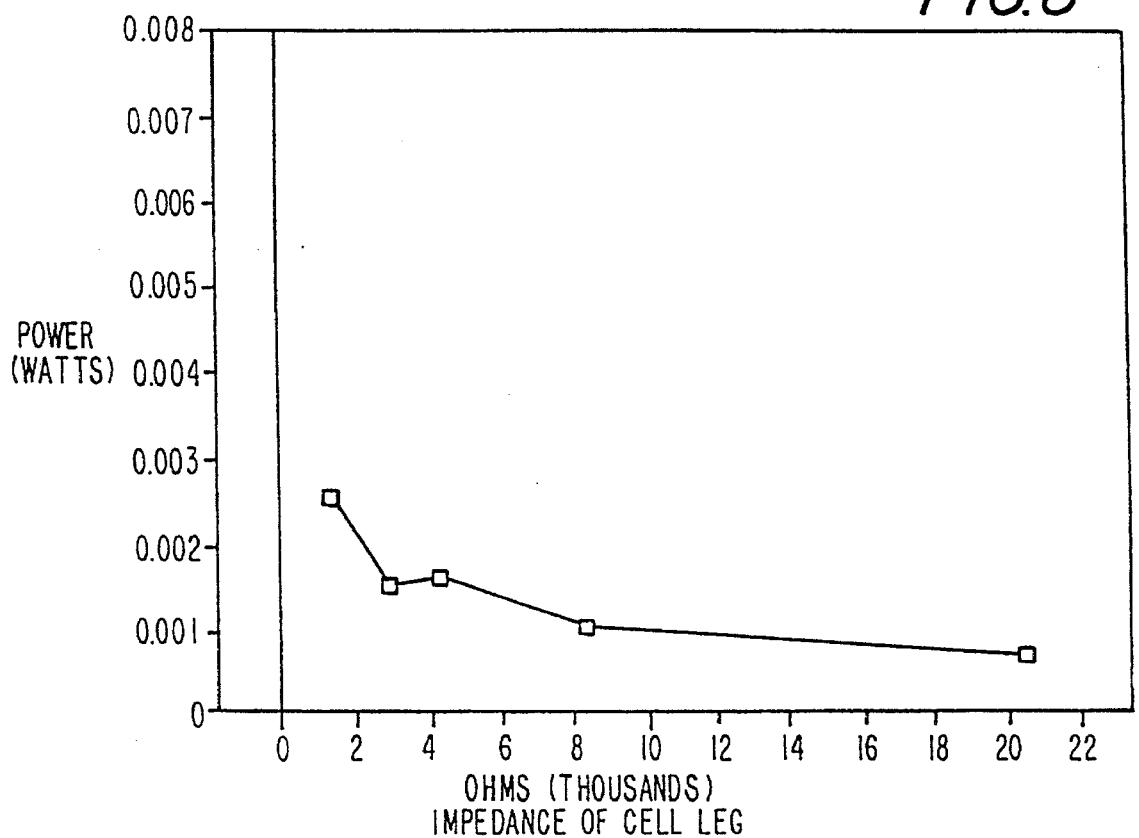
FIG. 8 is a graph of power applied at an electrode of a tilt sensor of the present invention versus the impedance between the electrode and the common electrode.

FIG. 8 shows a graph of the experimental results of power measured at the electrodes 55a, 55b versus the impedance between the electrodes 55a, 55b and common electrode 55c for these tilt sensors 50. As seen, power and impedance are inversely related: below an impedance of approximately 3000 ohms, the power in the electrolyte increased dramatically and load life performance degraded markedly. As defined above, the threshold power is where the load life performance markedly degrades. Thus, the point at which the power in the cell dramatically increases is additionally referred to as the threshold power.

The data contained in FIG. 8 is used to determine the threshold power density for this electrolyte. The threshold power for electrolytic degradation (i.e., where the power in the cell is shown to increase markedly) is approximately 0.0015 Watts where the area of the electrode exposed to the electrolyte is approximately 0.061 $cm^2$. Thus, the threshold power density of this ammonium carbonate electrolyte is approximately 0.03 $W/cm^2$. For power densities applied at the electrodes below this threshold (regardless of leg impedance, or, more generally, the resistivity of the electrolyte) the load life will be acceptable for a commercial sensor.

Accordingly, when the input voltage at the voltage supply 70 is reduced to approximately. 0.1 volts A.C., the power density is maintained below the threshold level for leg impedances even as low as 1500 ohms. At this input voltage, the load life for all of the above-enumerated impedances is less than 10% over 100 hours.

EXAMPLE #4

Electrodes 55a, 55b and common electrode 55c of a number of tilt sensors 50 of FIG. 5 are comprised of 52 Alloy. Electrolytic solution 60 of FIG. 5 is comprised of 90 percent by volume of butyl cellosolve, 10 percent by volume of distilled water and of ammonium carbonate. The amount of ammonium carbonate is varied among these tilt sensors 50 to achieve impedances of 3400, 4000, 4700, 5800, 9200 and 17,500 ohms. The tilt sensors 50 are each incorporated into an electrical circuit as shown in FIG. 5a. The applied voltage at the voltage supply 70 is 6.5 volts A.C.

The load life, measured as a change in voltage across resistor R1 over 100 hours, was 17% for the sensor having an impedance of 5800 ohms, 4% for the sensor having an impedance of 9200 ohms and 2% for an impedance of 17,500 ohms. For the sensors having impedances of 3400, 4000 and 4700 ohms, the load life was well over 25%. Thus, the load life improved with increasing resistivity. (As in Example #1, even at the lower impedances the load life should level off and remain below 25% for exposure times approaching 1000 hours.)

Figure 9:
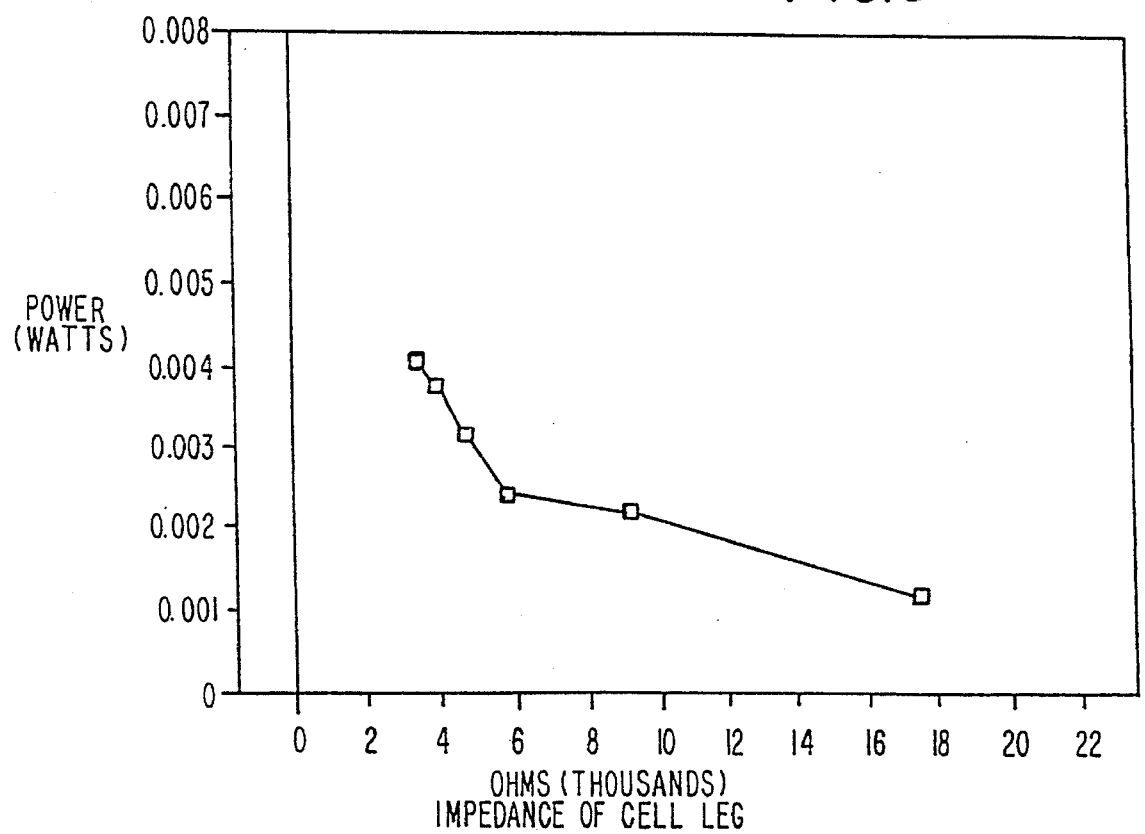
FIG. 9 is a graph of power applied at an electrode of a tilt sensor of the present invention versus the impedance between the electrode and the common electrode.

FIG. 9 shows a graph of the experimental results of power measured at the electrodes 55a, 55b versus the impedance between the electrodes 55a, 55b and common electrode 55c for these tilt sensors. As seen, power and impedance are inversely related: below an impedance of approximately 5500 ohms, the power in the electrolyte increased dramatically and load life performance degraded markedly. As defined above, the threshold power is where the load life performance markedly degrades. Thus, the point at which the power in the cell dramatically increases is additionally referred to as the threshold power.

The data contained in FIG. 9 is used to determine a threshold power density for this electrolyte. The threshold power for electrolytic degradation (i.e., where the power in the cell is shown to increase markedly) is approximately 0.0024 Watts where the area of the electrode exposed to the electrolytic solution is approximately 0.061 $cm^2$. Thus, the threshold power density of this ammonium carbonate electrolyte is approximately 0.04 $W/cm^2$. For power densities applied at the electrodes below this threshold (regardless of leg impedance, or, more generally, the resistivity of the electrolyte) the load life will be acceptable for a commercial sensor.

As previously noted, tilt sensor performance criteria may also call for the change in resistivity to be less than 25% over 1000 hours of usage and preferably for temperatures ranging between −20° C. and +50° C. When a particular tilt sensor with a certain voltage supplied across its electrodes is subject to a lower than room temperature environment, electrochemical reactions decrease and resistivity increases. Thus, when the initial (i.e., room temperature) resistivity and power density is set below the power density threshold, electrochemical degradation is not expected as the temperature is lowered, because the power density will remain below the threshold.

On the other hand, as the temperature increases above room temperature, electrochemical reactions increase and resistivity decreases, lowering the effective threshold power. Where the initial resistivity is relatively low, the electrochemical reactions may increase to the point where the threshold is crossed. When a tilt sensor is to be used in high temperature environments such an effect may be anticipated and compensated for by increasing the initial resistivity, decreasing the power delivered to the electrical circuit, increasing the surface area of the electrode, or any of the proceeding in combination.

The following example is of a non-precious metal electrode tilt sensor that has acceptable load life over a wide range of high and low temperatures:

EXAMPLE #5

To show that the non-precious metal electrode tilt sensors of the present invention may be constructed to have an acceptable load life over a range of operational temperatures, a number of tilt sensors 50 of FIG. 5 were constructed with electrodes 55a, 55b and common electrode 55c of tilt sensor 50 of FIG. 5 comprised of Kovar. Electrolytic solution 60 of FIG. 5 was comprised of 91 percent by volume of 2-Methoxy Ethanol, 9 percent by volume of distilled water and an amount of bicarbonate of soda sufficient to achieve an impedance of 1500 ohms. The electrolytic solution was subjected to "burn-in" by heating to 90° to 100° C. for 48 hours. The tilt sensors 50 were incorporated into an electrical circuit as shown in FIG. 5a. The applied voltage at the voltage supply 70 was 6.5 volts A.C.

Figure 10:
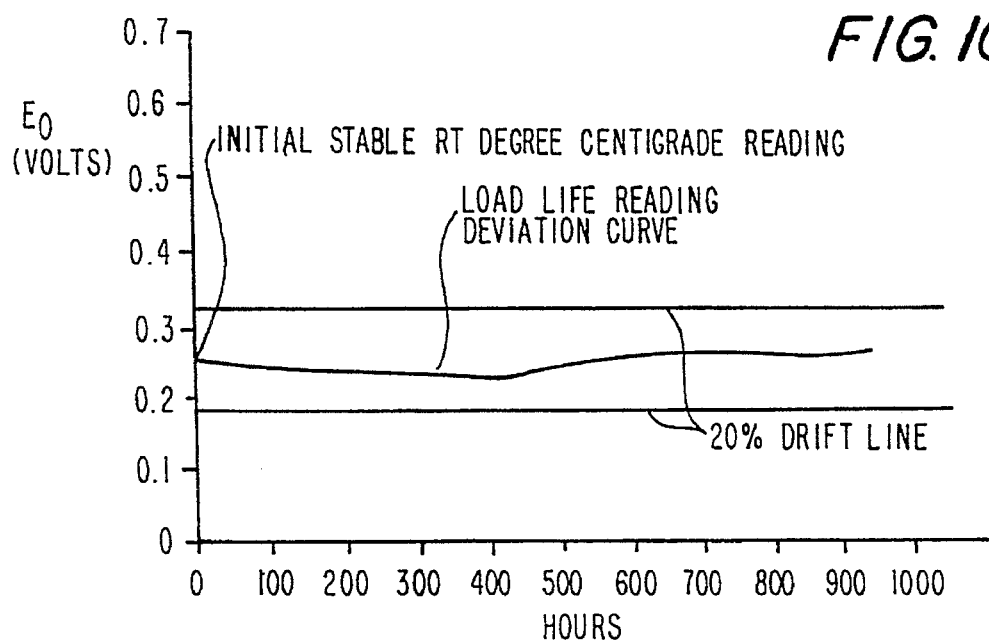
FIG. 10 is a graph of the change in output voltage $E_o$ of the circuit of FIG. 5a versus time for a tilt sensor of the present invention.

The load life, measured as a change in voltage across resistor R1, was approximately 4.2% over 930 hours at room temperature (25° C.). FIG. 10 shows that drift in voltage was well within 20% of the initial voltage during that time. Thus, at room temperature and for this applied voltage at the voltage supply, the power density at the electrode was less than the threshold power density.

Figure 11:
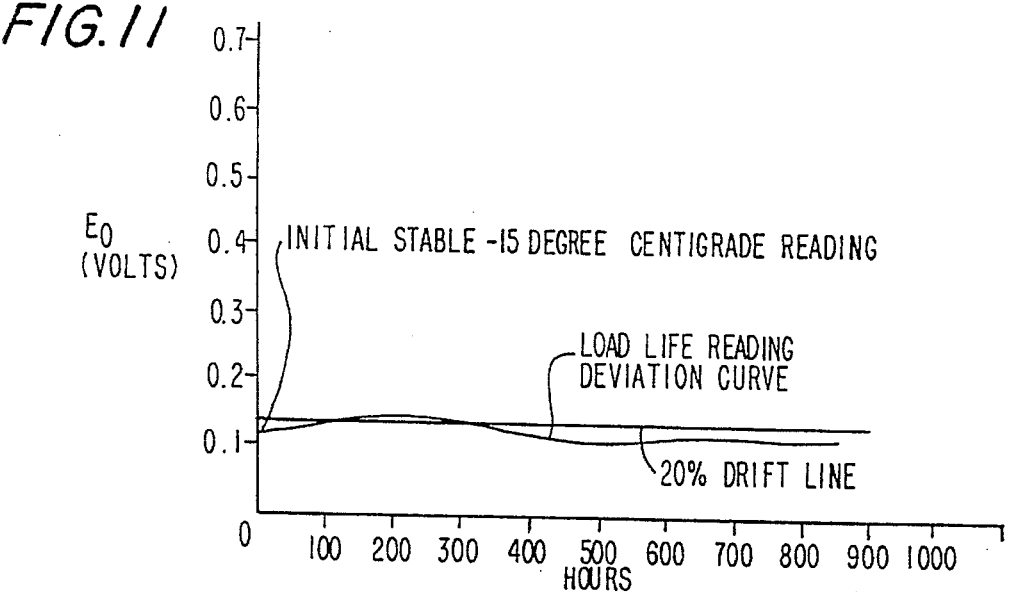
FIG. 11 is a graph of the change in output voltage $E_o$ of the circuit of FIG. 5a versus time for a tilt sensor of the present invention.
Figure 12:
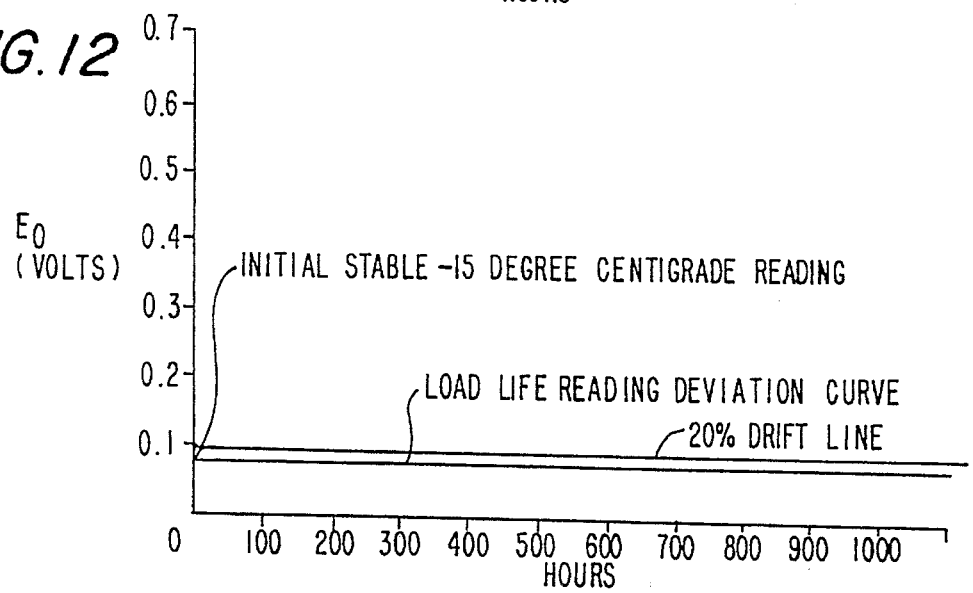
FIG. 12 is a graph of the change in output voltage $E_o$ of the circuit of FIG. 5a versus time for a tilt sensor of the present invention.

The same electrode/electrolytic solution was energized at −15° C. for over 900 hours is one case, and over 800 hours in another. FIGS. 11 and 12 show that drift in voltage was within 20% of the initial voltage during that time. When returned to room temperature, the change in leg temperature was immeasurable in one case, and 21% in another. Thus the sensor performed acceptably at low temperatures because, where the sensor is configured such that it does not exceed the threshold power density at room temperature, it should not exceed it at low temperatures.

Figure 13:
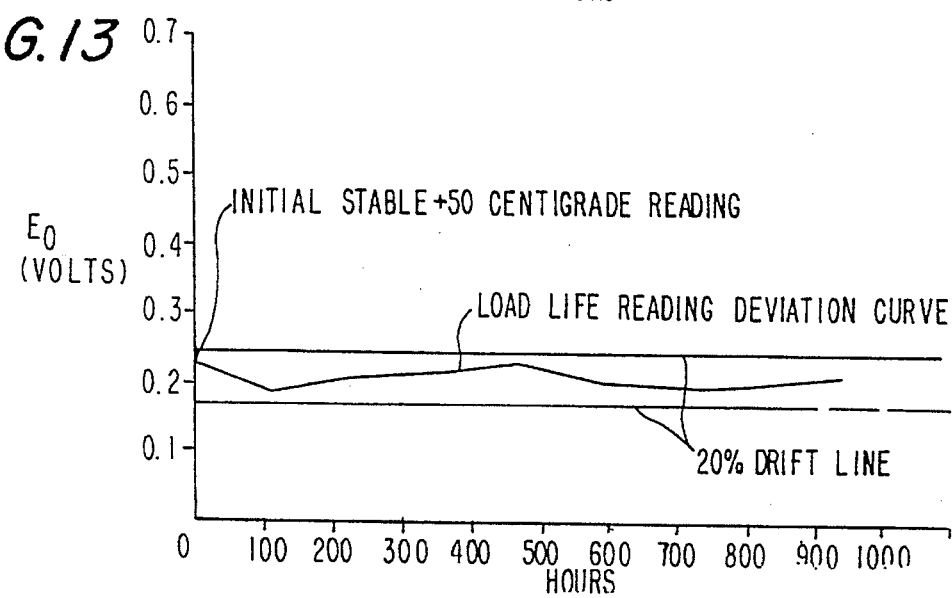
FIG. 13 is a graph of the change in output voltage $E_o$ of the circuit of FIG. 5a versus time for a tilt sensor of the present invention.

The same electrode/electrolytic solution was energized at 50° C. (±10°) for 912 hours. FIG. 13 shows that drift in voltage was within 20% of the initial voltage during that time. When returned to room temperature, the change in leg impedance was immeasurable. Thus, the sensor performed acceptably at high temperatures because, as configured, the electrochemical reactions did not increase (and resistivity of the electrolyte did not decrease) to the point where the threshold power density was exceeded at 50° C.

In the above temperature tests, not only were identically constructed sensors subjected to each of the three temperatures separately, but one single sensor was also subjected to all three temperature tests.

Figure 5C:
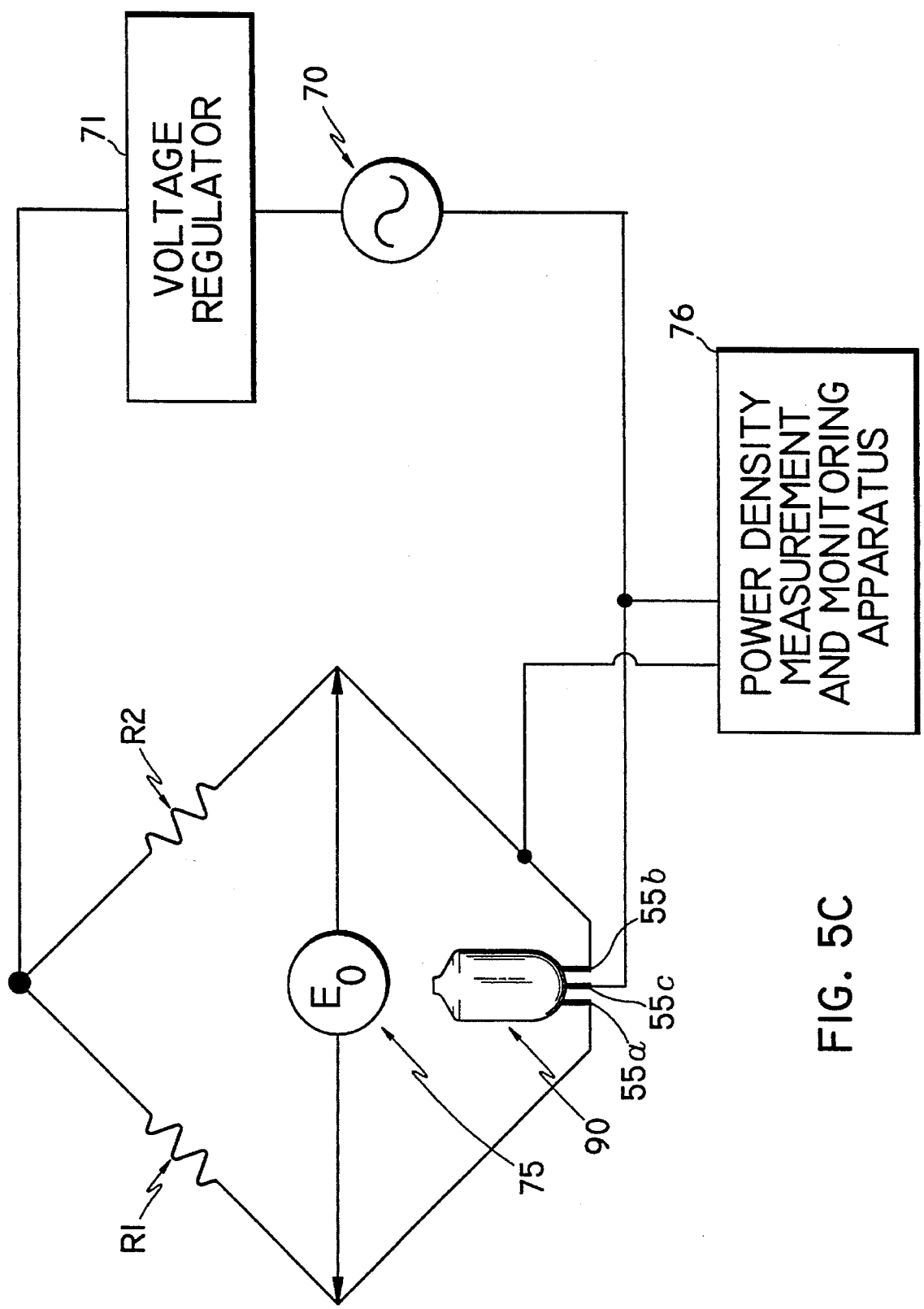
FIG. 5c is an electrical circuit incorporating the tilt sensor of FIG. 5.

The above examples give a protocol for determining the threshold power density for tilt sensors having a particular electrolyte and non-precious metal electrodes. As an alternative to determining the threshold power density by using a number of identical tilt sensors with different applied voltages, as in the examples, FIG. 5c shows how to determine the threshold power density by using a single tilt sensor. The tilt sensor 50 is incorporated into a circuit similar to the circuit of FIG. 5a, but with a voltage regulator 71 and apparatus for measuring and monitoring 76 the power density across the electrodes. Applying a voltage to the circuit, of course, creates a voltage across the electrodes 55a–c, and varying the voltage applied to the circuit via the voltage regulator likewise varies the voltage across the electrodes. A voltage applied across the electrodes induces an electrochemical current at the interface between the electrode and the electrolyte, thus generating power. Varying the voltage applied across the electrodes 55a–c consequently varies the power generated at the surfaces of the electrodes 55a–c. Thus, by varying the voltage applied to the circuit via the voltage regulator 71, the power generated at the surfaces of the electrodes 55a–c is varied.

As is axiomatic in the electro-chemical arts, the apparatus 76 for measuring and monitoring the power density across the electrodes may include a voltmeter and ammeter for simultaneous measurements of the amperage and voltage at the electrodes, giving the power, and determining power density from the known surface area of the electrode that provides the electro-chemical current. (It is known that the surface area of the portion of the electrode immersed in the electrolyte and facing the common electrode delimits the electro-chemical interface giving rise to a current, and thus a current or power density.) The threshold power density may be determined by varying the voltage applied across the electrodes via the voltage regulator 71 and simultaneously monitoring the power density via the apparatus 76 for measuring and monitoring the power density at the electrodes. The threshold power density is found when the apparatus 76 shows a marked rise (or decline) in power density across the electrodes. Once determined, the voltage supplied to the electrodes may be maintained so that the power density is below the threshold power density.

There are many other compositions for both the electrodes and electrolytic solution of the present invention that will be readily perceived and implemented without undue experimentation by one skilled in the art relying on the descriptions given above. Materials for the electrodes in the electrolytic tilt sensors of the present invention may also include: non-precious base metals with a platinum, gold or other precious metal coating, non-metallic material (including glass, ceramics, plastics, graphites, and glazed metals (such as porcelain)) with a platinum, gold or other precious metal mating, tungsten, molybdenum, Sylvania No. 4 alloy, tantalum, titanium, stainless steel, clean non-precious base metals, nickel, and nickel coated base metals. Electrolytic salts and ions used in the electrolytic solution of the present invention may also include: ammonia gas, carbon dioxide, ammonium hydroxide, citric acid, sodium hypophosphite, potassium acetate, potassium bromide, potassium fluoride, potassium iodide, lithium carbonate, phosphoric acid, sodium nitrate, sodium hydroxide, potassium dihydrogen phosphate, dibasic sodium phosphate and, generally, salts of dibasic, tribasic and polybasic acids. Solvents used in the electrolytic solution of the present invention may also include: butyl carbitol and methyl carbitol.

Thus, low cost tilt sensors have been constructed as follows, all with acceptable measures of performance:

A) Electrolyte comprised of 50 cc of 2-methoxy ethanol to 50 mg of potassium acetate; electrodes comprised of non-precious base metal with a gold film.

B) Electrolyte comprised of 50 cc of 2-methoxy ethanol to 125 mg of sodium nitrate; electrodes comprised of a non-precious base metal with a gold film.

C) Electrolyte comprised of 50 cc of 2-methoxy ethanol to 100 mg of sodium hydroxide; electrodes comprised of a non-precious base metal with a gold film.

D) Electrolyte comprised of 50 cc of 2-methoxy ethanol and 2 cc of water to 100 mg of potassium dihydrogen phosphate; electrodes comprised of a non-precious base metal with a gold film.

E) Electrolyte comprised of ethanol and sodium nitrate having an impedance of approximately 1200 ohms; electrodes comprised of a non-precious base metal with a gold film.

F) Electrolyte comprised of ethanol, sodium hydroxide and sodium nitrate having an impedance of approximately 1400 ohms; electrodes comprised of a non-precious base metal with a gold film.

G) Electrolyte comprised of methanol, sodium hydroxide and sodium nitrate having an impedance of approximately 1180 ohms; electrodes comprised of a non-precious base metal with a gold film.

H) Electrolyte comprised of 2-methoxy ethanol and sodium hydroxide having an impedance of approximately 5000 ohms; electrodes comprised of a non-precious base metal with a gold film.

I) Electrolyte comprised of 8 parts of butanol to 2 parts water and sodium nitrate, having an impedance of approximately 5000 ohms; electrodes comprised of a non-precious base metal with a gold film.

J) Electrolyte comprised of butanol, ethylene glycol and sodium nitrate having an impedance of approximately 1400 ohms; electrodes comprised of a non-precious base metal with a gold film.

K) Electrolyte comprised of ethanol, sodium hydroxide, and sodium nitrate having an impedance of approximately 1500 ohms; electrodes comprised of either a non-precious base metal (or glass) with a platinum or gold film, Kovar, tungsten, molybdenum, Sylvania No. 4 alloy, 52 Alloy, tantalum, titanium, stainless steel, non-precious base metal with gold plating, non-precious base metal with nickel plating, or nickel alloy plating. (The nickel alloy included phosphate.)

L) Electrolyte comprised of 9 parts of 2-methoxy ethanol to 1 parts water and bicarbonate of soda, having an impedance of 1500 ohms; electrodes comprised of either non-precious base metal with a platinum or gold film, Kovar, tungsten, molybdenum, Sylvania No. 4 alloy, 52 Alloy, tantalum, titanium, stainless steel, non-precious base metal with gold or silver plating, non-precious base metal with nickel plating, or nickel alloy plating. (The nickel alloy included phosphorus.)

M) Electrolyte comprised of 3 parts 2-methoxy ethanol to 2 parts ammonium hydroxide; electrodes comprised of either a non-precious base metal with a platinum or gold film, Kovar, tungsten, molybdenum, Sylvania No. 4 alloy, 52 Alloy, tantalum, titanium, or stainless steel. Electrolyte comprised of ethanol and phosphoric acid having an impedance of approximately 1500 ohms; electrodes comprised of a non-precious base metal with a platinum or gold film.

O) Electrolyte comprised of 5 to 10% water and 95 to 90% 2-methoxy ethanol and bicarbonate of soda, having an impedance of 1500 to 2000 ohms; electrodes comprised of either a non-precious base metal with a platinum or gold film, tungsten, molybdenum, Sylvania No. 4 alloy, 52 Alloy, tantalum, titanium, stainless steel, non-precious base metal with gold or silver plating, non-precious base metal with nickel plating, or nickel alloy plating. (The nickel alloy included phosphate.)

P) Electrolyte comprised of 20 parts ethanol to 5 parts water and bicarbonate of soda, having impedance of approximately 1400 ohms; electrodes comprised of either a non-precious base metal with a platinum or gold film, tungsten, molybdenum, Sylvania No. 4 alloy, 52 Alloy, tantalum, titanium, stainless steel, non-precious base metal with a gold or silver plating, non-precious base metal with nickel plating, or nickel alloy plating. (The nickel alloy included phosphate.)

For these embodiments, the electrolyte may be "burned in" (i.e., heated to a temperature of approximately 100° C. over 16 hours) in order to obtain acceptable performance of the electrolytic sensor.

Referring now to FIG. 14, there is illustrated a prior art tilt sensor 200 including a glass container 210 containing an electrolytic solution, and a ceramic base 212 through which electrodes 214 pass for connection with an appropriate electrical circuit. Base 212 defines a flat surface which is particularly adapted to facilitate a level connection with a planar printed circuit board. However, during manufacture, the electrodes 214 may not be in vertical alignment with the side walls of the glass container 210. Thus, when the ceramic base 212 was mounted (to a circuit board, for example) the tilt sensor 200 would produce inaccurate output signals during operation.

Turning to FIG. 15, a leveling collar 250 is illustrated which has a substantially cylindrical outer wall 252 and a substantially planar bottom surface 254. The inner wall 256 of collar 250 is particularly dimensioned and configured to support and circumscribe the electrolytic tilt sensor 50 illustrated in FIG. 5.

As shown in FIG. 16, the glass cell 52 of tilt sensor 50 has a rounded bottom surface through which electrodes 55a–55c extend. The rounded surface makes it difficult to mount the electrodes to a planar circuit board in a manner so that the sensor is properly leveled. By supporting tilt sensor 50 within collar 250 and mounting the bottom surface 254 thereof to a planar circuit board, proper leveling of the sensor can be achieved. Furthermore, the collar provides a mechanism for adjusting the position of the tilt sensor relative to the circuit board to account for any misalignment in the construction of the tilt sensor. FIG. 17 shows the collar 250 mounted to a printed circuit board 300 so that the electrodes (not visible in FIG. 17) are aligned within the circuit board 300. The outer wall 252 is substantially perpendicular to the plane of the circuit board 300.

It will be understood that various modifications can be made to the various embodiments of the present invention herein disclosed without departing from its spirit and scope. As repeatedly noted, various configurations of the tilt sensor and electrical circuit are contemplated, as well as various compositions of the electrodes and electrolytic solutions. Therefore the above description should not be construed as limiting the invention but merely as presenting preferred embodiments of the invention. Those skilled in the art will envision other modifications within the scope and spirit of the present invention as defined by the claims presented below.

What is claimed is:

1. An electrical circuit comprising:
   a) an electrolytic tilt sensor including:
      i) a closed containment vessel;
      ii) an electrolyte sealed within the containment vessel; and
      iii) a plurality of electrodes including a common electrode projecting through the closed containment vessel, the electrodes formed at least in part with a non-precious metal and at least partially immersed in the electrolyte, the electrodes and electrolyte having a threshold power density above which the power at the surfaces of the electrodes increases markedly and the load life performance degrades markedly; and
   b) a voltage source electrically connected to the plurality of electrodes, the voltage source adapted such that a power density generated at the surface of any one of the electrodes is below the threshold power density.

2. An electrical circuit as in claim 1, wherein the containment vessel is made of glass.

3. An electrolytic tilt sensor comprising:
   a) containment vessel;
   b) an electrolyte sealed within the containment vessel;
   c) a plurality of electrodes including a common electrode formed at least in part with a non-precious metal and at least partially immersed in the electrolyte, the electrodes and electrolyte having a threshold power density above which the power at the surfaces of the electrodes increases markedly and the lead life performance degrades markedly:
   d) a voltage source applied across at least one electrode and the common electrode, the voltage source adapted such that a power density generated at the surface of the at least one electrode is below the threshold power density.

4. An electrolytic tilt sensor as in claim 3, wherein the electrodes are at least partially comprised of a non-precious metal selected from the group consisting of tungsten, molybdenum, Sylvania No. 4 alloy, 52 Alloy, tantalum, titanium, stainless steel, and nickel.

5. An electrolytic tilt sensor as in claim 3, wherein the electrodes are at least partially comprised of a non-precious metal with a metal plating selected from the group consisting of gold, silver and nickel.

6. An electrolytic tilt sensor as in claim 3, wherein the electrodes are at least partially comprised of a non-precious metal with a metal film selected from the group consisting of platinum, gold and silver.

7. An electrolytic tilt sensor as in claim 3, wherein the electrolyte is at least partially comprised of a gaseous electrolyte.

8. An electrolytic tilt sensor as in claim 3, wherein the electrolyte is at least partially comprised of an electrolytic salt selected from the group consisting of ammonia gas, carbon dioxide, ammonium hydroxide, citric acid, sodium hypophosphite, lithium carbonate, phosphoric acid, sodium nitrate, sodium hydroxide, potassium dihydrogen phosphate, bicarbonate of soda and dibasic sodium phosphate.

9. An electrolytic tilt sensor as in claim 3 wherein the plurality of electrodes includes a pair of parallel electrodes parallel to the common electrode, the pair of electrodes disposed in such a manner as to define an axis.

10. An electrolytic tilt sensor as in claim 3 wherein the plurality of electrodes includes at least two pairs of parallel electrodes, each pair disposed in such a manner so as to define distinct axes of orientation with respect to one another.

11. An electrolytic tilt sensor as in claim 3, wherein the containment vessel is at least partially comprised of a plastic selected from the group consisting of epoxies, polyesters, polyvinyl chloride, polycarbonate, thermoplastic and thermoset plastic.

12. An electrolytic tilt sensor as in claim 1, wherein the electrodes are at least partially comprised of a non-precious metal with a precious metal coating.

13. An electrolytic tilt sensor as in claim 1, wherein the containment vessel is made of glass.

14. An electrolytic tilt sensor as in claim 3, further comprising an electrical circuit with a voltage supply and an output voltage, the electrical circuit connected to at least two of the electrodes.

15. An electrolytic tilt sensor as in claim 14, wherein the output voltage is correlated to the angle of tilt of the tilt sensor.

16. An electrolytic tilt sensor as in claim 14, wherein the electrical circuit is configured such that the voltage applied across at least two of the electrodes is less than that which would cause a threshold power density at the surface of any one of the electrodes to be exceeded.

17. An electrolytic tilt sensor as in claim 3, wherein the electrolyte is at least partially comprised of ammonium carbonate.

18. An electrolytic tilt sensor as in claim 17, wherein at least part of the electrodes are comprised of Kovar.

19. An electrolytic tilt sensor as in claim 17, wherein the threshold power density is substantially in the range between 0.02 to 0.04 Watts per centimeter.

20. An electrolytic tilt sensor as in claim 3, wherein the containment vessel has a rounded bottom and a plurality of electrodes projecting from the bottom of the containment vessel for connection to an electrical circuit, the electrical circuit being imprinted on a planar printed circuit board, and wherein the tilt sensor further comprises means adjacent the containment vessel and extending substantially normal to the plane of the circuit board for aligning the containment vessel with respect to the printed circuit board in such a manner so that the electrodes of the vessel are perpendicular to the circuit board.

21. In an electrolytic tilt sensor as recited in claim 20, the means for aligning comprising a cylindrical collar dimensioned and configured to circumscribe the containment vessel, the collar having a planar end surface mountable to the planar printed circuit board.

22. In a method of determining tilt angle using an electrolytic tilt sensor, wherein the tilt sensor, having a plurality of non-precious metal electrodes and a common electrode at least partially immersed in an electrolyte, the electrodes and electrolyte having a threshold power density above which the power at the surfaces of the electrodes increases markedly and the load life performance degrades markedly, and configured as part of an electrical circuit with a voltage supply, provides an output voltage that is proportional to the tilt angle, the improvement comprising:

maintaining the voltage applied across the electrodes and the common electrode of the tilt sensor such that a power density generated at the surface of any one of the electrodes and the common electrode is below the threshold power density.

23. Method of determining the operative parameters of a tilt sensor comprising the steps of:

a) providing a tilt sensor including
   i) a containment vessel;
   ii) an electrolyte sealed within the containment vessel; and
   iii) a plurality of electrodes including a common electrode formed at least in part with a non-precious metal and at least partially immersed in the electrolyte, the electrodes and electrolyte having a threshold power density above which the power at the surfaces of the electrodes increases markedly and the load life performance degrades markedly;

b) applying a voltage across at least two of the electrodes;

c) monitoring the power generated at the surface of at least one electrode and the common electrode;

d) varying the applied voltage such that a power density generated at the surface of any one of the electrodes and the common electrode is below the threshold power density and;

e) determining the threshold power density, such that in use the threshold power density generated at the surface of any one of the electrodes and the common electrode is not exceeded when a voltage is applied across at least two of the electrodes.

24. Method as in claim 23, wherein the step of determining the threshold power density is achieved by dividing the magnitude of the power at which the power at the surface at any one of the electrodes and the common electrode increases markedly and the load life performance degrades markedly by the surface area of the interface between the electrode and the electrolyte where an electrochemical current is emitted.

25. Method as in claim 23, wherein the step of applying a voltage across at least two of the electrodes includes the step of electrically connecting at least two electrodes into an electrical circuit with a voltage supply.

26. Method as in claim 25, wherein the step of varying the applied voltage includes the step of varying the voltage of the voltage supply.

27. Method as in claim 23, wherein the step of monitoring the power at at least one of the electrodes includes the step of monitoring the voltage and current at the electrode.

28. Method as in claim 27, wherein the step of varying the applied voltage such that the power as monitored at at least one of the electrodes exceeds the threshold power value includes the step of monitoring the voltage and current at the at least one of the electrodes.

* * * * *